United States Patent Office 3,136,809
Patented June 9, 1964

3,136,809
STABILIZATION OF ALPHA, BETA-UNSATURATED NITRILES
Robert R. Seiler, Woodbury, N.J., assignor to E. I. du Pont de Nemours and Company, Wilmington, Del., a corporation of Delaware
No Drawing. Filed May 18, 1962, Ser. No. 196,005
10 Claims. (Cl. 260—465.9)

This invention relates to the stabilization of alpha, beta-unsaturated nitriles. More specifically, this invention relates to a method for inhibiting the polymerization of alpha,beta-unsaturated nitriles and to the stabilized compositions so obtained.

The unsaturated nitriles, particularly the alpha,beta-unsaturated nitriles, have become increasingly important as starting materials in the manufacture of synthetic textile fibers, elastomers, plastics, and the like, and the usefulness of such nitriles continues to increase as investigations are extended to other areas of industrial activity.

In the manufacture and use of the alpha, beta-unsaturated nitriles, however, difficulty frequently is encountered in refining, handling, and storage of the nitriles and mixtures containing them due to the ease with which such unsaturated nitriles may polymerize. Impurities present in the crude or otherwise contaminated unsaturated nitriles frequently are of a type which accelerate the polymerization of the nitriles, even in storage at ordinary conditions. Increasing the temperature likewise increases the tendency of the nitriles to polymerize with resulting loss of valuable and useful material. Furthermore, since distillation at elevated temperatures is a commonly used purification technique in the manufacture of the nitriles, refining of crude or semi-finished porducts may be hampered seriously by formation of resinous polymeric material which accumulates in the equipment, fouling filters and heat-transfer surfaces, and ultimately plugging the system so that it must be shut down for cleaning and rehabilitation.

The present invention provides a method for inhibiting polymerization and discoloration of alpha,beta-unsaturated nitriles, both impure and refined, by incorporating into said nitriles of the formula

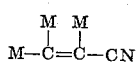

wherein the M's are the same or different radicals selected from the group consisting of hydrogen and alkyl radicals containing from 1 to 8 carbon atoms, a minor amount of a stabilizer having the general formula

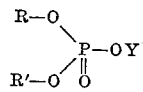

in which R is a radical selected from the group consisting of aliphatically saturated hydrocarbon radicals (i.e. any unsaturation is aromatic) having from 1 to 20 carbon atoms and radicals formed by removing one hydroxyl group from a polyalkylene glycol of the general formula $HO(CHE—O—CH_2)_rCHEOH$ wherein E is hydrogen or an alkyl radical containing 1 to 3 carbon atoms and $r$ has a value such that the average molecular weight of the polyalkylene glycol lies between 150 and 6000; R' is a radical selected from the group of radicals consisting of R as defined above, and Y, and Y is a radical of the formula

in which R" is a radical selected from the group of alkyl radicals having from 1 to 20 carbon atoms and hydroxy or alkoxy substituted alkyl radicals having from 1 to 4 carbon atoms, and R''' and R'''' are radicals selected from the group consisting of R" as defined above and hydrogen.

Acrylonitrile and substituted acrylonitriles, wherein the substituents are alkyl radicals containing 1 to 8 carbon atoms, represent a class of monomers which can be inhibited against polymerization by means of stabilizers of the kind disclosed herein.

The stabilizers may be incorporated into the unsaturated nitriles in any of various stages. For instance, the stabilizer may be incorporated into the crude nitrile prior to purification, or may be introduced directly into a distillation column thereby preventing polymerization of said nitrile in the column at distillation temperatures, or the stabilizer may be added to purified nitrile prior to its being stored and shipped.

Compositions comprising an alpha,beta-unsaturated nitrile and said stabilizing additives exhibit no significant polymer formation during prolonged periods of normal storage or when subjected to temperatures commonly encountered during purification by distillation techniques.

An additional advantage of this invention is that the stabilizers can be prepared economically from readily available materials. A still further advantage of this invention is that the stabilizers can be separated easily and completely from the nitrile compositions so that there is no adverse effect in the subsequent utilization of the alpha,beta-unsaturated nitriles in the preparation of polymers and copolymers, and for other purposes.

In the examples below, which illustrate specific embodiments of the invention, the extent of the stabilization which is achieved by the method and in the compositions of the present invention is demonstrated both by accelerated stability tests and by outstandingly favorable experience in use of the invention during manufacturing operations.

For evaluating stability in the accelerated test, the test vessel is a glass tube about 1 in. I.D. x 6 in. long x 2 mm. thick, closed at one end and tapered at the other to a tubular neck 6 in. long x 12 mm. I.D. To conduct the test, a 30 ml. sample of the composition to be evaluated, which is prepared by mixing the desired amounts of additives with the alpha,beta-unsaturated nitrile, is introduced into a tube through the neck, the tube and contents are cooled in a sub-zero temperature bath, and the small diameter neck is sealed below the open end by fusing the glass in a flame. The sealed test tube and contents are brought to room temperature, suitably supported, and then immersed in a heating bath thermostatically controlled at the desired test temperature, usually 100° C. or 140° C. If desired, the tubes in the heated bath may be exposed to ultraviolet light of controlled and reproducible intensity which acts as a promoter and reduces the time required to make tests at lower temperatures. Polymerization is observed as a very distinct end point characterized by formation of a cloud which appears suddenly and is easily detected. The polymerization times observed for separate portions of a given nitrile composition are easily reproduced within a ±5% time range.

Each set of tests includes a standard, usually the highly refined unsaturated nitrile, with which the unknowns can be compared directly for time of polymerization and for control over the conditions of testing.

The results of the accelerated stability test are expressed in terms of a ratio designated as the stabilization factor (SF) which is defined as follows:

$$SF = \frac{\text{Time for polymerization with additive}}{\text{Time for polymerization without additive}}$$

Thus, additives which exhibit stabilizing action will show an SF>1, inactive materials an SF of about 1, and polymerization accelerators will show an SF<1.

Tests made in the manner described are conducted on highly refined alpha,beta-unsaturated nitriles free of stabilizers to establish a reference base, and also on the same nitriles having incorporated therein known stabilizers, on nitriles containing stabilizers of the present invention, and on various nitrile-containing process-streams both with and without stabilizers according to the present invention. Results of such accelerated stability tests, as summerized below, illustrate clearly (a) the undesirable effects of low concentrations of dissolved iron compounds which very often are present due to slight corrosion of ferrous processing equipment or from other sources, (b) the performance of some presently used commerical stabilizers, and (c) the marked advantage of stabilized compositions of the present invention over those known heretofore.

EXAMPLE 1

This example illustrates stabilization of acrylonitrile under several conditions, the stabilizing action of various additives, and the polymerization-accelerating action of iron compounds.

The samples for testing are prepared and the accelerated stability tests are carried out in the manner described in the paragraphs above. Some specific experimental conditions are given in Table I, together with the corresponding SF values.

The data in Table I show that dissolved iron, even at very low concentrations, markedly accelerates the polymerization of acrylonitrile under all test conditions (tests 2, 7, and 13). Two commonly used commercial stabilizers, p-nitrosodimethyl aniline and the monomethyl ether of hydroquinone, give favorable results as expressed by their SF values of 7 to 4.5 (tests 3, 8, and 10). However, the addition of iron even at low concentrations very materially reduces the stability of the compositions and minimizes the effectiveness of these commercially used stabilizers (tests 4 and 9). The presence of the diethylamine salts of octylphenyl dihydrogen phosphate and bis(octylphenyl) hydrogen phosphates in acrylonitrile eliminates the effects of soluble iron (tests 5 and 11) and provides more effective stabilization of acrylonitrile than is achieved with the heretofore commonly used stabilizers at a temperature of 100° C., with or without catalysis by ultraviolet radiation.

EXAMPLE 2

Since processing temperatures in the manufacture of acrylonitrile may exceed 100° C., additional evaluations of stabilization factors for compositions of the present invention are carried out at 140° C. This example illustrates the effectiveness of the instant method of stabilization of acrylonitrile at the higher temperature.

Samples are prepared and SF measurements are carried out in the general manner described above for making accelerated stability tests. Data for a number of such tests carried out at 140° C. are recorded in Table 2.

Table 2

| Test | Additive to acrylonitrile | | S.F. (at 140 °C.) |
|---|---|---|---|
| | Kind | Concentration, p.p.m. | |
| 1 | Triethanolamine salt of mixed mono-and diethyl acid phosphates. | 240 | 2.0 |
| 2 | Triethanolamine salt of mixed butyl acid phsophates. | 240 | 2.0 |
| 3[1] | "Primene" 81-R salt of diisooctyl acid phosphates. | 240 | 2.3 |
| 4 | Triethanolamine salt of mixed tridecyl acid phosphates. | 240 | 3.5 |
| 5 | Triethanolamine salt of mixed hexadecyl acid phosphates. | 240 | 4.0 |
| 6 | Ethanolamine salt of mixed butyl acid phosphates. | 240 | 5.0 |
| 7 | Ethylamine salt of mixed methyl acid phosphates. | 240 | 9.5 |
| 8 | 2-Ethylhexylamine salt of mixed isooctyl acid phosphates. | 240 | 12.7 |
| 9 | 2-Ethylhexylamine salt of mixed tridecyl acid phosphates. | 240 | 15 |
| 10 | Ethanolamine salt of mixed ethyl acid phosphates. | 240 | 18 |
| 11 | Triethanolamine salt of mixed isooctyl acid phosphates. | 240 | 18 |
| 12[2] | "Virco-Pet" 20. | 240 | 30 |
| 13[3] | Triethanolamine salt of mixed "Lorol" acid phosphates. | 240 | 35 |
| 14 | Ethanolamine salt of mixed methyl acid phosphates. | 240 | 72 |
| 15 | Diethanolamine salt of mixed butyl acid phosphates. | 240 | >100 |
| 16 | Mixture of the diethylamine salts of mono (polyethylene glycol half ester) and bis (polyethylene glycol half ester) of ortho phosphoric acid. | 240 | >200 |
| 17 | Diethylamine salt of mixed (2-ethylhexyl) acid phosphates. | 240 | 975 |

">" indicates that polymerization had not yet started when SF test was discontinued.
[1] "Primene" 81-R=$C_{12}$ to $C_{14}$ tertiary alkyl primary amine supplied by Rohm & Haas Co.
[2] "Virco-Pet" 20=A mixture of the diethylamine salts of octylphenyl dihydrogen phosphate and bis (octylphenyl) hydrogen phosphate (U.S. Patent No. 2,903,393).
[3] "Lorol"=A group of straight chain even numbered alkanols ranging rom C-8 to C-18 supplied by E.I. du Pont de Nemours & Co.

Table 1

| Test | Additive | | U.V. radiation used | Test temp., ° C. | Polymerization time | Stabilization factor (SF) |
|---|---|---|---|---|---|---|
| | Kind[1] | Conc., p.p.m. | | | | |
| 1 | None | | No | 100 | 24 hrs | 1 |
| 2 | Fe$^{+3}$ | 5 | No | 100 | 1½ hrs | 0.06 |
| 3 | PNDMA | 40 | No | 100 | 7 days | 7 |
| 4 | PNDMA+Fe$^{+3}$ | 40+5 | No | 100 | 17 hrs | 0.7 |
| 5 | "Virco-Pet" 20+Fe$^{+3}$ | ca. 100+5 | No | 100 | 13-14 days | 13.5 |
| 6 | None | | Yes | 100 | 20 min | 1 |
| 7 | Fe$^{+3}$ | 5 | Yes | 100 | 1½ min | 0.05 |
| 8 | PNDMA | 40 | Yes | 100 | 120 min | 6 |
| 9 | PNDMA+Fe$^{+3}$ | 40+5 | Yes | 100 | 10 min | 0.5 |
| 10 | MEHQ | 240 | Yes | 100 | 90 min | 4.5 |
| 11 | "Virco-Pet" 20+Fe$^{+3}$ | 40+5 | Yes | 100 | 160 min | 8 |
| 12 | None | | No | 140 | 2 min | 1 |
| 13 | Fe$^{+3}$ | 5 | No | 140 | (est.) 8 sec | 0.07 |

[1] Identities:
PNDMA=p-Nitrosodimethylaniline.
Fe$^{+3}$ added as ferric sulfate or ferric chloride.
MEHQ=Monomethyl ether of hydroquinone.
"Virco-Pet" 20=Mixture of the diethylamine salts of octyl-phenyl dihydrogen phosphate and bis (octyl-phenyl) hydrogen phosphate (U.S. Patent No. 2,903,393).

The data clearly show that a wide variety of amine salts of mono- and diesters of ortho phosphoric acid as additives produce stabilized acrylonitrile compositions, and that some of said salts are outstandingly effective stabilizers for the alpha, beta-unsaturated nitrile.

EXAMPLE 3

This example further illustrates that very unstable soluble-iron-containing acrylonitrile compositions are stabilized by the process of this invention.

Portions of acrylonitrile containing about 5 to 10 p.p.m. of soluble iron compounds are mixed with additives designated in Table 3 to give stabilized compositions. The SF determinations are made in the absence of ultraviolet radiation in the general manner described above. The stability factors determined for these compositions are recorded in the last column of Table 3. These data show that mono- and dialkyl acid phosphates, made by action of an alcohol on phosphloric anhydride, provide some stabilizing action on acrylonitrile, but that substituted ammonium salts of mixed alkyl acid phosphates are more effective stabilizers than the mixed alkyl acid phosphates themselves.

Table 3

| Test | Additive (plus soluble iron) designation | Concentration, p.p.m. | SF (at 140° C.) |
|---|---|---|---|
| 1 [1] | Mixed mono- and di-"Lorol" acid phosphates. | 240 | 3 |
| 2 | Mixed mono- and di-tridecyl acid phosphates. | 240 | 6.5 |
| 3 [2] | "Virco-Pet" 20 | 240 | ca. 14 |
| 4 | Additive No. 16 of Table 2 | [4] 3 | >200 |
| 5 [3] | "Primene" 81-R salts of mixed isooctyl acid phosphates. | 1,000 | >200 |
| 6 | 2-ethylhexyl amine salts of mixed isooctyl acid phosphates. | 1,000 | >200 |

">" indicates that polymerization had not occurred when SF test was discontinued.
[1] "Lorol" = Mixed straight chain alkanols having even numbers of carbon atoms from 8 to 18.
[2] "Virco-Pet" 20 = A mixture of the diethylamine salts of octylphenyl dihydrogen phosphate and bis(octylphenyl)hydrogen phosphate (U.S. Patent No. 2,903,393).
[3] "Primene" 81 R = Mixture of primary amines whose R groups comprise $C_{12}$ to $C_{14}$ branched chains.
[4] 3 p.p.m. greater than amount required to chelate $F^{+3}$ present.

EXAMPLE 4

This example illustrates the effectiveness of the process and compositions of the present invention when applied to methacrylonitrile, another alpha,beta-unsaturated nitrile.

The stabilizer indicated below is mixed with methacrylonitrile, both with and without added dissolved iron compounds, to give compositions of the instant invention. In accelerated stability tests carried out at 140° C. in the general manner described heretofore, the following stabilization factors are observed:

Methacrylonitrile (reference) _____ 1
Methacrylonitrile +500 p.p.m. of amine salt 16 in Table 2 _____ 10
Methacrylonitrile +5 p.p.m. $Fe^{+3}$+500 p.p.m. of amine salt 16 in Table 2 _____ 10

These results further demonstrate the enhanced stability of compositions of the present invention.

EXAMPLE 5

This example illustrates the beneficial results achieved by an embodiment of this invention when applied to acrylonitrile in the course of its manufacture.

In a plant for the manufacture of acrylonitrile in which semi-finished acrylonitrile was distilled, operation of the distillation unit was interrupted repeatedly after 30 to 50 hours because of the deposition on heat transfer surfaces of resinous iron-containing polymerized acrylonitrile. After cleaning the equipment and mixing enough of the amine salt 16 of Table 2 above with the crude acrylonitrile to maintain a concentration of 50 to 150 parts of additive per million parts of nitrile, the distillation unit was operated continuously for approximately 1000 hours without trouble due to polymer formation. When the equipment was shut down, the distilling column was in excellent condition and, when put on-stream again, the column continued to give trouble-free operation.

Representative of some of the alpha,beta-unsaturated nitriles defined by the formula

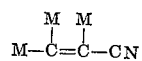

above, in addition to acrylonitrile and methacrylonitrile, are crotononitrile, 2-pentene nitrile, 2-methyl-2-butenenitrile, 3-methyl-2-butenenitrile, 3-methyl-2-pentenenitrile, 4-methyl-2-pentenenitrile, 2-methyl-2-pentenenitrile, 2-ethyl-2-butenenitrile, 2,3,3-trimethyl-2-butenenitrile, 3-methyl-2-hexenenitrile, 2,4-dimethyl-2-pentenenitrile, 3-methyl-2-nonenenitrile, α-isopropyl-β-isobutyl acrylonitrile, 2-decenenitrile, 3-methyl-2-nonenenitrile, 4-ethyl-2-octenenitrile, and 2-undecenenitrile.

While a wide range of concentration of additives is illustrated in the above examples, only a relatively small concentration of the phosphate additives is required for stabilization, over and above the amount which is needed to react with the soluble iron in the nitrile composition. Test 4 in Table 3 clearly is illustrative of this relationship. The concentration of the stabilizer necessary to establish and maintain the stability of the nitrile compositions necessarily will vary with the stabilizer used, the nature of the stabilized composition, and also with the processing or exposure conditions. In general, however, stabilizers present in a concentration .0001 to 0.1% by weight of nitrile, and preferably in the range of .0001 to 0.025%, will effectively prevent the polymerization and discoloration of the nitrile compositions.

The stabilizers used in the compositions of this invention are effective in stabilizing α,β-unsaturated nitriles under many conditions of storage and processing, and when desired the inhibitors can be separated from the stabilized unsaturated nitrile compositions of this invention by any technique well known to those skilled in the art such as distillation, extraction, or adsorption. Generally, however, the separation conveniently can be made by a simple distillation, the recovered nitrile then being useable as desired in polymerization systems without other special treatment.

Any salt formed by reaction of a mono-, di-, or trialkylamine containing up to 20 carbon atoms, or of a hydroxy or alkoxy substituted mono-, di-, or trialkyl amine containing up to four carbon atoms per alkyl group, with a mono- or diester of ortho-phosphoric acid, and mixtures of such salts, may be used in the practice of the instant invention. Said salts are the reaction products of a mono- or diester of ortho-phosphoric acid, or mixtures thereof, having the general formula

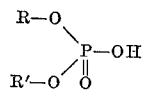

wherein R is defined before and R' is the same as R or hydrogen, with substantially chemically equivalent amounts of an amine having the general formula

in which R", R'" and R"" are as defined before. More particularly, and illustrative of the stabilizers forming a part of this invention, are said salts wherein R may be methyl, ethyl, butyl, n-octyl, iso-octyl, 2-ethylhexyl, tridecyl, hexadecyl, stearyl, eicosyl, cyclopentyl, cyclohexyl, benzyl, phenyl, ter-butyl methyl phenyl, octyl phenyl, and like radicals, or radicals derived by removal of one hydroxyl group from polyethylene glycol, polypropylene glycol, and polybutylene glycol; and R'' may be methyl, ethyl, hydroxyethyl, methoxyethyl, butyl, hydroxybutyl, 1,3-dihydroxy-ter-butyl, methoxyisopropyl, 2-ethyl hexyl, ter-octyl, lauryl, myristyl, palmityl, stearyl, benzyl, cyclohexyl, and like radicals.

As many widely different embodiments of this invention may be made without departing from the spirit and scope thereof, it is to be understood that the invention is not limited to the specific embodiments disclosed herein except as defined in the appended patent claims.

What is claimed is:

1. A composition comprising:
    (1) an alpha, beta-unsaturated nitrile of the formula

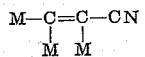

wherein the M's each represent a member of the group consisting of hydrogen and alkyl of 1 to 8 carbons, and
    (2) from about 0.0001 to about 0.1% by weight of said nitrile of a polymerization inhibitor having the formula

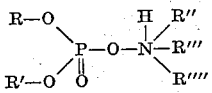

wherein
    (a) R is a member of the group consisting of aliphatically saturated hydrocarbon of 1 to 20 carbons and the radical formed by removing one hydroxyl group from a polyalkylene glycol of the formula $$HOCH_2(CHE-O-CH_2)_rCHEOH$$

E being a member of the group consisting of hydrogen and alkyl of 1 to 3 carbons and $r$ being such that the average molecular weight of the glycol lies between 150 and 6000,
    (b) R' is a member of the group consisting of R and

(c) R'' is a member of the group consisting of alkyl of 1 to 20 carbons and hydroxyalkyl and alkoxyalkyl of 1 to 4 carbons, and
    (d) R''' and R'''' each represent a member of the group consisting of hydrogen and R''.

2. The composition of claim 1 wherein said nitrile is acrylonitrile.

3. The composition of claim 1 wherein said nitrile is methacrylonitrile.

4. The composition of claim 1 wherein the said polymerization inhibitor is present in an amount of 0.0001 to 0.025% by weight of said nitrile.

5. The composition of claim 1 wherein the polymerization inhibitor comprises a mixture of compounds of said general formula wherein R is a radical formed by removing one hydroxyl group of a polyethylene glycol of average molecular weight of about 400, R' is a member of the group consisting of R and the diethylamino group, and

is the diethylamino group

6. A process for inhibiting the polymerization of alpha, beta-unsaturated nitriles of the formula

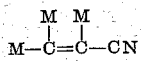

which comprises mixing therewith a polymerization inhibitor of the formula

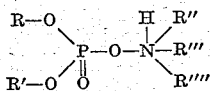

wherein M, R, R', R'', R''', and R'''' are as defined in claim 1, said inhibitor being present in an amount of about 0.0001 to about 0.1% by weight of said nitrile.

7. The process of claim 6 wherein the alpha, beta-unsaturated nitrile is acrylonitrile.

8. The process of claim 6 wherein the alpha-beta-unsaturated nitrile is methacrylonitrile.

9. The process of claim 6 wherein the polymerization inhibitor is used in an amount of 0.0001 to 0.25% by weight of the nitrile.

10. A process for inhibiting the polymerization of acrylonitrile which comprises mixing therewith about 0.0001 to about 0.1% by weight of acrylonitrile, of a mixture of polymerization inhibitors having the formula

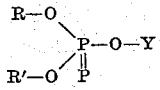

in which R is a radical formed by removing one hydroxyl group of a polyethylene glycol of the general formula $HOCH_2(CH_2-O-CH_2)_rCH_2OH$, $r$ being such that the glycol has an average molecular weight of about 400, R' is a member of the group consisting of R and the diethylamino group, and Y is the diethylamino group.

References Cited in the file of this patent

UNITED STATES PATENTS

| | | |
|---|---|---|
| 2,516,914 | Revukas | Aug. 1, 1950 |
| 2,932,661 | Campbell et al. | Apr. 12, 1960 |
| 3,029,136 | Myers | Apr. 10, 1962 |

OTHER REFERENCES

Bergmann: "The Chemistry of Acetylene and Related Compounds," 1948, page 80, Interscience Pub. (N.Y.)

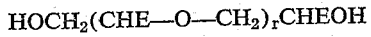

UNITED STATES PATENT OFFICE
CERTIFICATE OF CORRECTION

Patent No. 3,136,809                          June 9, 1964

Robert R. Seiler

It is hereby certified that error appears in the above numbered patent requiring correction and that the said Letters Patent should read as corrected below.

Column 8, lines 37 to 40, the formula should appear as shown below instead of as in the patent:

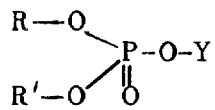

Signed and sealed this 29th day of September 1964.

(SEAL)
Attest:

ERNEST W. SWIDER                              EDWARD J. BRENNER
Attesting Officer                                    Commissioner of Patents